(12) United States Patent
Narita

(10) Patent No.: US 10,210,619 B2
(45) Date of Patent: Feb. 19, 2019

(54) IMAGE PROCESSING APPARATUS FOR SELECTING AN OBJECT IMAGE TO BE PROCESSED BASED ON A DETERMINATION RESULT OF CORRELATION, IMAGE PICKUP APPARATUS, AND STORAGE MEDIUM FOR STORING IMAGE PROCESSING PROGRAM

(71) Applicant: CANON KABUSHIKI KAISHA, Tokyo (JP)

(72) Inventor: Yu Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 15/060,947

(22) Filed: Mar. 4, 2016

(65) Prior Publication Data

US 2016/0260227 A1   Sep. 8, 2016

(30) Foreign Application Priority Data

Mar. 6, 2015   (JP) .................................. 2015-044461

(51) Int. Cl.
*G06K 9/00* (2006.01)
*G06T 7/207* (2017.01)
*G06T 7/246* (2017.01)

(52) U.S. Cl.
CPC .............. *G06T 7/207* (2017.01); *G06T 7/248* (2017.01); *G06T 2207/10016* (2013.01); *G06T 2207/20016* (2013.01)

(58) Field of Classification Search
CPC ....... G06T 7/2073; G06T 7/207; G06T 7/248; G06T 2207/10016; G06T 2207/20016

USPC .......................................................... 382/107
See application file for complete search history.

(56) References Cited

U.S. PATENT DOCUMENTS

| | | | | |
|---|---|---|---|---|
| 2009/0324013 A1* | 12/2009 | Tanaka | .................... | G06T 7/246 382/103 |
| 2012/0162454 A1* | 6/2012 | Park | ...................... | H04N 5/145 348/208.6 |
| 2012/0269393 A1* | 10/2012 | Komoto | ................. | G06T 13/40 382/103 |

FOREIGN PATENT DOCUMENTS

JP           3935500 B       3/2007

* cited by examiner

*Primary Examiner* — Andrew M Moyer
(74) *Attorney, Agent, or Firm* — Cowan, Liebowitz & Latman, P.C.

(57) ABSTRACT

An image processing apparatus includes an image acquiring unit configured to acquire, based on an input image, a plurality of resolution hierarchical images having resolutions that are different from one another, an extracting unit configured to extract a feature point in each of the plurality of resolution hierarchical images, a determining unit configured to determine a correlation among the plurality of feature points in the plurality of resolution hierarchical images using information on positions of the plurality of feature points in each resolution hierarchical image, and a selecting unit configured to select at least one processing object image to be processed with the feature point in the plurality of resolution hierarchical images, based on a determination result of the correlation.

6 Claims, 6 Drawing Sheets

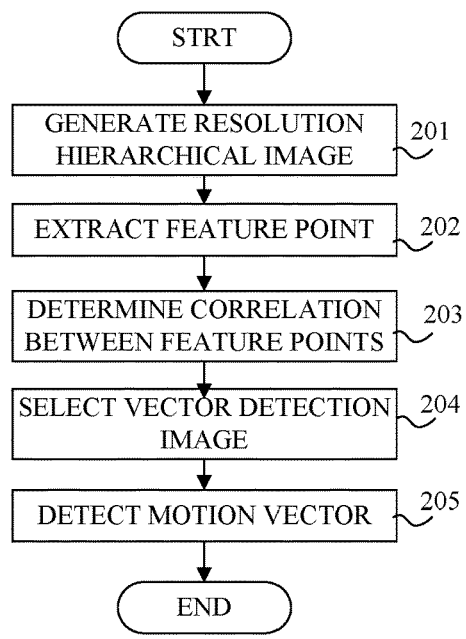
FIG. 2
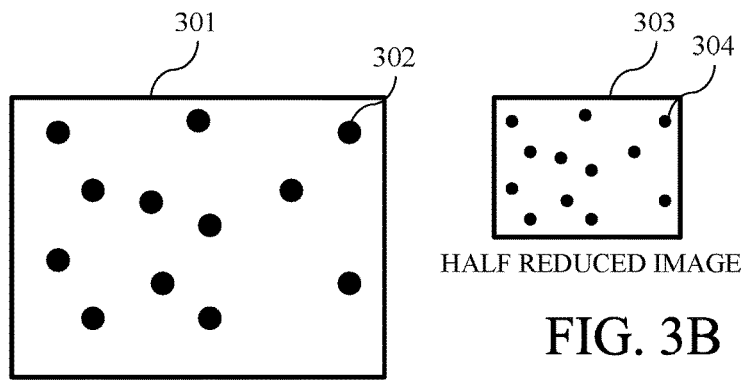
FIG. 3A — EQUALLY SIZED IMAGE
FIG. 3B — HALF REDUCED IMAGE
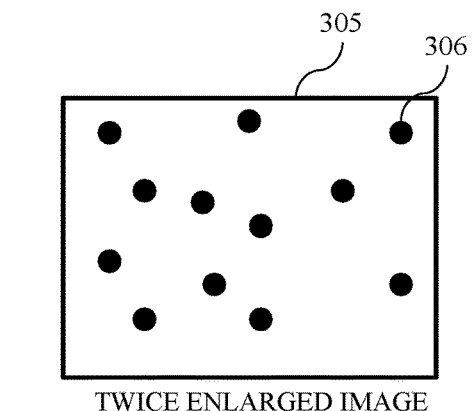
FIG. 3C — TWICE ENLARGED IMAGE

HALF REDUCED IMAGE

TWICE ENLARGED IMAGE

EQUALLY SIZED IMAGE

IMAGE PROCESSING APPARATUS FOR SELECTING AN OBJECT IMAGE TO BE PROCESSED BASED ON A DETERMINATION RESULT OF CORRELATION, IMAGE PICKUP APPARATUS, AND STORAGE MEDIUM FOR STORING IMAGE PROCESSING PROGRAM

BACKGROUND OF THE INVENTION

1. Field of the Invention

The present invention relates to image processing technology for detecting a motion vector among a plurality of frame images.

2. Description of the Related Art

For image stabilization and dynamic range enlargement processing in image processing of an image acquired by an image pickup apparatus, such as a digital camera, motion vectors are detected from a plurality of frame images in a video image, and used to align the frame images with one another. The motion vector detecting processing is often performed through template matching.

In the template matching, one of two frame images is set to a reference image, and the other is set to an object image. Then, a template block is set to a rectangular area having a predetermined size in the reference image, and correlations calculated between each of the rectangular areas at a plurality of positions in the object image and the luminance distribution of the template block. The position of the rectangular area having the highest correlation in the object image is a destination of the template block, and a direction to the destination and a moving amount in the object image is a direction and magnitude of the motion vector, on the basis of the position of the template block in the reference image. The motion vector cannot be precisely detected if there is no characteristic texture in the template block in the reference image.

Accordingly, Japanese Patent No. 3935500 discloses a method for extracting a feature point, such as a corner, from a reference image, and for setting the template block so as to include the extracted feature point, improving the detecting reliability of the motion vector.

One detecting method of the motion vector is to detect the following resolution hierarchical motion vector. In detecting the resolution hierarchical motion vector, a plurality of resolution hierarchical images having different resolutions are generated from an input image. Initially, a motion vector is detected from the resolution hierarchical image having the lowest resolution, and a motion vector is sequentially detected in one lower (higher resolution) resolution hierarchical image by referring to the motion vector detected in the resolution hierarchical image in one higher (lower resolution) resolution hierarchical image. Japanese Patent No. 3935500 detects the resolution hierarchical motion vector using the feature point.

However, in extracting the feature point from the resolution hierarchical image, a position of the extracted feature point and a feature amount are often different due to the difference of the resolution of the resolution hierarchical image. In order to detect the resolution hierarchical motion vector, it is thus necessary to consider the difference of the feature point between the higher and lower resolution hierarchical images. However, the method disclosed in Japanese Patent No. 3935500 does not consider the difference of the feature point, and merely detects the motion vector using the feature point extracted from the resolution hierarchical image having the predetermined resolution.

SUMMARY OF THE INVENTION

This invention provides an image processing apparatus and an image pickup apparatus which can select a resolution hierarchical image for proper processing using a feature point even when there is a difference in feature point among the resolution hierarchical images.

An image processing apparatus according to the present invention includes an image acquiring unit configured to acquire, based on an input image, a plurality of resolution hierarchical images having resolutions that are different from one another, an extracting unit configured to extract a feature point in each of the plurality of resolution hierarchical images, a determining unit configured to determine a correlation among the plurality of feature points in the plurality of resolution hierarchical images using information on positions of the plurality of feature points in each resolution hierarchical image, and a selecting unit configured to select at least one processing object image to be processed with the feature point in the plurality of resolution hierarchical images, based on a determination result of the correlation, wherein at least one processor or circuit is configured to perform a function of at least one of the units.

Further features of the present invention will become apparent from the following description of exemplary embodiments with reference to the attached drawings.

BRIEF DESCRIPTION OF THE DRAWINGS

FIG. 2 is a flowchart for explaining image processing performed in the first embodiment.

FIGS. 3A-3C are views for explaining a correlation determination of a feature point according to the first embodiment.

DESCRIPTION OF THE EMBODIMENTS

Referring now to the accompanying drawings, a description will be given of embodiments of the present invention.

First Embodiment

Figure 1:
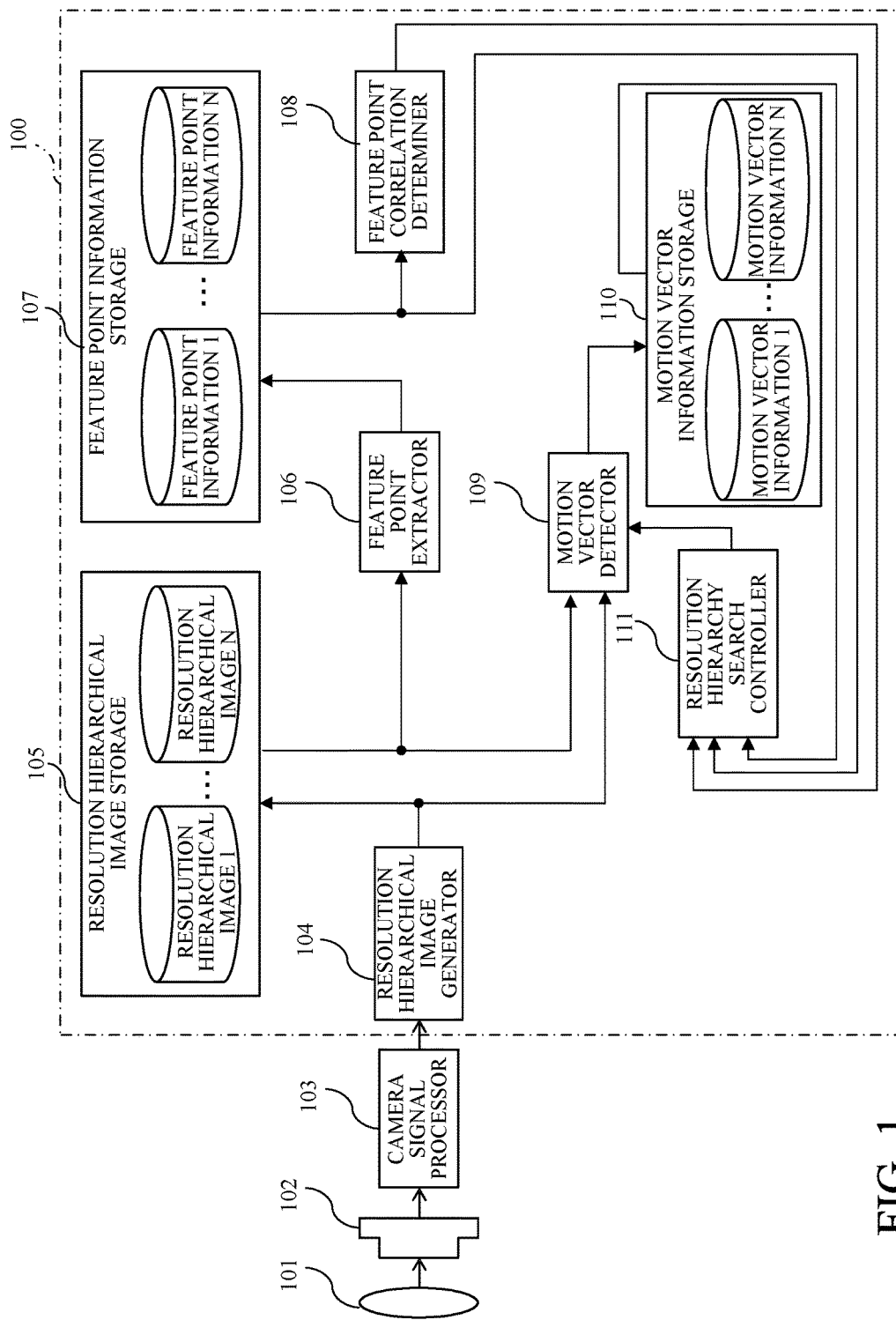
FIG. 1 is a block diagram illustrating a structure of an image pickup apparatus according to a first embodiment of the present invention.

FIG. 1 illustrates a structure of an image pickup apparatus according to a first embodiment of the present invention. An image capturing optical system 101 forms an object image, and an image sensor 102 photoelectrically converts (or takes) the object image formed by the image capturing optical system 101.

A camera signal processor 103 includes an unillustrated A/D converter, auto gain controller ("AGC"), and auto white balance circuit, and generates a digital image signal ("input image") based on an analogue electric signal output from the image sensor 102. The image sensor 102 and the camera signal processor 103 form an image capturing unit configured to generate an input image through image capturing.

This image capturing optical system includes an image processing apparatus 100 enclosed by an alternate long and short dash line. A resolution hierarchical image generator (resolution hierarchical image acquiring unit) 104 generates plural image data ("resolution hierarchical image" hereinafter) in which the resolution is stepwise lower than that of the input image, by applying a blur filter and an average value filter to the input image. The input image itself is acquired as one resolution hierarchical image (that has the highest resolution). In other words, a plurality of resolution hierarchical images including the input image are acquired using the input image. The resolution hierarchical image generator 104 stores, in a resolution hierarchical image storage 105, resolution hierarchical images having resolutions that are different from one another.

The resolution image generator 104 may generate the resolution hierarchical images in which their resolutions are stepwise reduced, by reducing the input image at predetermined ratios different from one another instead of applying the blur filter etc. to the image filter.

A feature point extractor 106 extracts a plurality of feature points from each of a plurality of resolution hierarchical images stored in the resolution hierarchical image storage 105 and stores, as feature point information, a feature amount and a coordinate indicative of a position of each extracted feature point in a feature point information storage 107. The feature amount extractor 106 serves as an extractor and a feature amount acquirer.

The feature point correlation determiner (correlation determiner) 108 determines a correlation between the feature points by comparing a plurality of feature points extracted from the plurality of resolution hierarchical images stored as feature point information in the feature point information storage 107, and outputs a determination flag indicative of a determination result to a resolution hierarchy search controller 111. A description will be given later of a method for determining the correlation between feature points.

A motion vector detector (processor) 109 detects a motion vector through template matching to two resolution hierarchical images having the same resolutions input from the resolution hierarchical image generator 104 and the resolution hierarchical image storage 105. The motion vector detector 109 stores information of the detected motion vector (direction and size or collectively referred to as "motion vector information" hereinafter) in a motion vector information storage 110.

The resolution hierarchy search controller (selecting unit) 111 controls the motion vector detector 109 based on the feature point information stored in the feature point information storage 107, the determination flag from the feature point correlation determiner 108, and the motion vector information stored in the motion vector information storage 110.

The image processing apparatus 100 including the components 104 to 111 is constituted by an image processing computer, such as a CPU and an MPU, and executes image processing expressed by a flowchart in FIG. 2 in accordance with an image processing program as a computer program.

In Step S201, the image processing apparatus 100 makes the resolution hierarchical image generator 104 generate a plurality of resolution hierarchical images. In the following description, the resolution hierarchical image generator 104 generates an intermediate-resolution image as a half reduced image (½ reduction image) relative to the input image and a low-resolution image as a quarter reduced image (¼ reduction image) relative to the input image based on a high-resolution image as the input image an equally sized image (1/1 sized image). In other words, in the following Steps S202 to S204, processing is performed for three resolution hierarchical images including the input image.

Next, in Step S202, the image processing apparatus 100 makes the feature point extractor 106 extract a feature point from each of the above three resolution hierarchical images. One method for extracting the feature point can use, for example, a Harris corner detector and a method of Shi and Tomasi. These methods express a luminance value of a pixel (x, y) of the image as I(x, y), and produces an autocorrelation matrix H expressed by Expression (1) based on the result Ix, Iy of applying horizontal and perpendicular primary differential filters to the image.

[Expression 1]

$$H = G * \begin{pmatrix} Ix^2 & IxIy \\ IxIy & Iy^2 \end{pmatrix} \quad (1)$$

In Expression (1), G denotes smoothness of the Gaussian distribution expressed by Expression (2).

[Expression 2]

$$G(x, y) = \frac{1}{2\pi\sigma^2} \exp\left(-\frac{x^2 + y^2}{2\sigma^2}\right) \quad (2)$$

Based on the feature evaluation expression expressed by Expression (3), the Harris detector extracts, as the feature point, pixels in which feature evaluation values (referred to as "feature amounts" hereinafter) increase.

[Expression 3]

$$\text{Harris} = det(H) - \alpha(tr(H))^2 (\alpha = 0.04 \sim 0.15) \quad (3)$$

In Expression (3), "det" denotes a matrix expression, and "tr" denotes a sum of the diagonal components. In addition, "α" denotes a constant, and a value between 0.04 and 0.15 is regarded as an experimentally good value to "α."

On the other hand, Shi and Tomasi uses a feature evaluation expression expressed by Expression (4).

[Expression 4]

$$\text{Shi and Tomasi} = \min(\lambda 1, \lambda 2) \quad (4)$$

Expression (4) means that a smaller one of eigenvalues λ1 and λ2 in the autocorrelation matrix H in Expression (1) is set to the feature amount. Even when Shi and Tomasi is used, the pixels in which the feature amounts increase are extracted as the feature points.

Next, in Step S203, the image processing apparatus 100 makes the feature point correlation determiner 108 determine the correlation (matching property) between feature points extracted in the resolution hierarchical images regarding the three resolution hierarchical images obtained in Step S202.

FIGS. 3A-3C illustrate a determination example of the correlation between the feature points (which will be referred to as a "feature point correlation" hereinafter) among the equally sized image (high-resolution image) and the half reduced image (intermediate-resolution image). In FIG. 3A, reference numeral 301 denotes an equally sized image (1/1 sized image), reference numeral 302 denotes a feature point extracted from the equally sized image. In FIG. 3B, reference numeral 303 denotes a half reduced image (½ reduction image), and reference numeral 304 denotes a feature point extracted from the half reduced image.

The feature point correlation is determined by comparing the coordinates of the feature points 302 and 304 with each other. In order to compare the coordinates of the feature points, it is necessary to equalize the scales of the coordinates to each other. Herein, the half reduced image 303 is enlarged twice so that the coordinates of the feature points 304 in the half reduced image can be equal to the coordinates of the feature points 302 in the equally sized image. In FIG. 3C, reference numeral 305 denotes an image (twice enlarged image) after the half reduced image 303 is twice enlarged, and reference numeral 306 is a feature point in the twice enlarged image 305.

Next, the coordinate of the feature point 302 in the equally sized image 301 is set to (Xi, Yi), and the coordinate of the feature point 306 corresponding to the feature point 302 in the equally sized image 301 is set to (Ui, Vi) in the twice enlarged image 305, and a coordinate difference (positional shift amount) between a pair of corresponding feature points is calculated. As the difference D, a distance total value between both coordinates can be used, for example, as illustrated in Expression (5).

[Expression 5]

$$D = \sum_{i=0}^{N-1} \sqrt{(X_i - U_i)^2 + (Y_i - V_i)^2} \quad (5)$$

Herein, N is the number of feature points. As the difference D becomes smaller, the feature point correlation becomes higher.

When the number of feature points 302 is different from the number of feature points 306, the number may be adjusted to one of them or the different number may be treated as the difference. In order to adjust the number of feature points, the predetermined number of feature points in order from the highest feature point may be set to the effective number. Alternatively, as described in a second embodiment later, in order to adjust the number of feature points, the resolution hierarchical image may be divided into the predetermined number of image areas and the predetermined number of feature points may be extracted for each image area. If the feature point (Ui, Vi) corresponding to the feature point (Xi, Yi) does not exist due to the different number of feature points, the distance may be reflected on the difference D in which (Ui, Vi) is regarded as the predetermined coordinate, such as (0, 0).

A many-valued determination may be used by using a reciprocal of the difference D for the feature point correlation, etc. or a binary determination may be used in which whether the feature point correlation is high or low is determined. In the many-valued determination of the feature point correlation, it is determined that the "feature point correlation is high" when the relatively high feature point correlations are obtained in all feature point correlations whereas it is determined that the "feature point correlation is low" when the relatively low feature point correlations are obtained. In the binary determination, when the difference D is smaller than a predetermined threshold or when the feature point correlation is higher than a predetermined correlation value, it is determined that the "feature point correlation is high"; otherwise the "feature point correlation is low." The predetermined threshold may be changed according to an object, a capturing environment, an image pickup mode, etc. The feature point correlation determiner 108 outputs the determination result of the feature point correlation as the determination flag. For example, when the feature point correlation is high, the determination flag of 0 is output and the determination flag of 1 is output when the feature point correlation is low.

Thus, based on the difference D calculated by Expression (5), the feature point correlation determiner 108 determines the feature point correlations among the equally sized image, the half reduced image, and the quarter reduced image. The image processing apparatus 100 executes Step S204 after Step S203.

In Step S204, the image processing apparatus 100 makes the resolution hierarchy search controller 111 select the resolution hierarchical image ("vector detection image" hereinafter) that is an object of the detection processing of the motion vector, based on the determination result of the feature point correlation among the resolution hierarchical images acquired in Step S203. The vector detection image corresponds to a processing object image or an image to be processed.

Table 1 indicates an illustrative selection method of the vector detection image. Herein, LRI denotes a low-resolution image, IRI denotes an intermediate-resolution image, and HRI denotes a high-resolution image.

TABLE 1

| CORRELATION DETERMINATION RESULT | | | VECTOR |
|---|---|---|---|
| LRI vs IRI | IRI vs HRI | LRI vs HRI | DETECTION IMAGE |
| 0 | 0 | (0) | LRI IRI HRI |
| 0 | 1 | (1) | LRI IRI |
| 1 | 0 | (1) | IRI HRI |
| 1 | 1 | 0 | LRI HRI |
| 1 | 1 | 1 | HRI |

0: CORRELATION IS HIGH
1: CORRELATION IS LOW

The first column to the third column in Table 1 indicate the determination results (determination flag values) of the feature point correlation between the low-resolution image (quarter reduced image) and the intermediate-resolution image (half reduced image), between the intermediate-resolution image and the high-resolution image, and between the low-resolution image and the high-resolution image, respectively. As described above, the determination flag of 0 means that the feature point correlation is high, and the determination flag of 1 means that the feature point correlation is low. The determination result with a parenthesis in the third column is automatically determined by the determination result of the first and second columns, and the determination in Step S203 can be omitted.

The resolution hierarchy search controller 111 selects, as the vector detection images, two or more resolution hierarchical images having high feature point correlations. For example, as illustrated in the first row, all resolution hierarchical images are selected as vector detection images when the feature point correlations are high in all cases, i.e., between the low-resolution image and the intermediate-resolution image, between the intermediate-resolution image and the high-resolution image, and between the low-resolution image and the high-resolution image. In addition, when, as illustrated in the second row in Table 1, the feature point correlation is high between the low-resolution image and the intermediate-resolution image, but the feature point correlations are low between the intermediate-resolution image and the high-resolution image and between the low-resolution image and the high-resolution image, the low-resolution image and the intermediate-resolution image are selected as vector detection images.

On the other hand, when, as illustrated in the fifth row in Table 1, the predetermined resolution hierarchical image or one resolution hierarchical image, such as a high-resolution image, is selected as a vector detection image when the feature point correlations are low in all cases, i.e., between the low-resolution image and the intermediate-resolution image, between the intermediate-resolution image and the high-resolution image, and between the low-resolution image and the high-resolution image.

TABLE 2

| ADDRESSED HIERARCHICAL IMAGE | CORRELATION DETERMINATION RESULT | | | VECTOR DETECTION IMAGE |
|---|---|---|---|---|
| | LRI vs IRI | IRI vs HRI | LRI vs HRI | |
| LRI | 1 | — | 1 | LRI |
| | 1 | — | 0 | LRI HRI |
| | 0 | — | 1 | LRI IRI |
| | 0 | — | 0 | LRI IRI HRI |
| IRI | 1 | 1 | — | IRI |
| | 1 | 0 | — | IRI HRI |
| | 0 | 1 | — | LRI IRI |
| | 0 | 0 | — | LRI IRI HRI |
| HRI | — | 1 | 1 | HRI |
| | — | 1 | 0 | LRI HRI |
| | — | 0 | 1 | IRI HRI |
| | — | 0 | 0 | LRI IRI HRI |

0: CORRELATION IS HIGH
1: CORRELATION IS LOW

In the example in Table 1, the vector detection image is selected only based on the feature point correlation between resolution hierarchical images, but the resolution hierarchical image that satisfies the predetermined condition about the magnitude of the feature amount may be selected as one vector detection image. For example, since the resolution hierarchical image that includes the feature point having a large feature amount is highly likely to contain definite texture suitable for the template matching, the detecting precision of the template matching or the motion vector becomes higher by using such resolution hierarchical images for the vector detection images.

For example, as the above predetermined condition, the resolution hierarchy search controller 111 selects as the addressed resolution hierarchical image (specified resolution hierarchical image) the resolution hierarchical image that contains the feature point having the largest feature amount in the above three resolution hierarchical images. Then, it determines whether or not the correlation is high between the feature points extracted from the addressed resolution hierarchical images and the feature points extracted from other resolution hierarchical images. When the feature point correlation is high, the addressed resolution hierarchical image and the other resolution hierarchical image having a high feature point correlation with the addressed resolution hierarchical image are selected as the vector detection images. On the other hand, only the addressed resolution hierarchical image is selected as the vector detection image when the correlation is low between the feature points extracted from the addressed resolution hierarchical image and the feature points extracted from the other resolution hierarchical image.

Thus, the vector detection image can be selected based on the feature point correlation and the magnitude of the feature amount by providing the addressed resolution hierarchical image.

The other predetermined condition is conceivable for use with a selection of the addressed resolution hierarchical image. Initially, the resolution hierarchical image having the highest average value of the feature amounts contained in the same resolution hierarchical image is selected as the addressed resolution hierarchical image. Alternatively, the resolution hierarchical image having at least one feature point with the feature amount equal to or higher than the predetermined value may be set to the addressed resolution hierarchical image. In the latter case, it is necessary to finally select only one addressed resolution hierarchical image since a plurality of addressed resolution hierarchical images may be obtained. For example, the resolution hierarchical image having the highest resolution may be selected.

It is considered that the response of the feature amount is different for each resolution hierarchical image due to the difference of the resolution. The feature amount may be normalized before the feature amounts of the resolution hierarchical images are compared with each other. In case of the many-valued correlation determination result, the vector detection image may be selected based on the magnitude of the feature point correlation of the resolution hierarchical image. For example, two resolution hierarchical images having the highest feature point correlation are selected. More specifically, when the feature point correlation between the low-resolution image and the intermediate-resolution image is highest, these low-resolution image and the intermediate-resolution image are selected.

Even when the feature point correlation between the two resolution hierarchical images is not highest but sufficiently high, these two resolution hierarchical images may be selected as the vector detection images. In this case, the resolution hierarchical image having the correlation in the predetermined width may be selected as the vector detection image based on the maximum value of the feature point correlation.

Next, in Step S205, the image processing apparatus 100 makes the motion vector detector 109 detect the motion vector using the feature point information obtained through the resolution hierarchy search controller 111 among the frame images in each vector detection image selected in Steps S204. In this case, the motion vector detector 109 detects the resolution hierarchical motion vector.

Figure 4A:
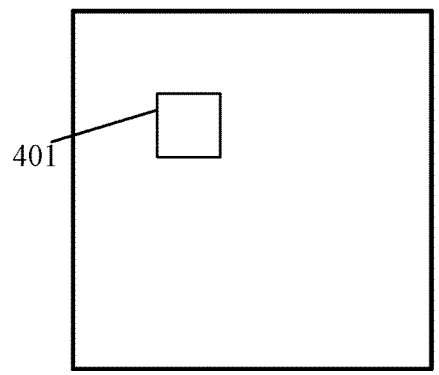
FIGS. 4A and 4B are views for explaining template matching according to the first embodiment.
Figure 4B:
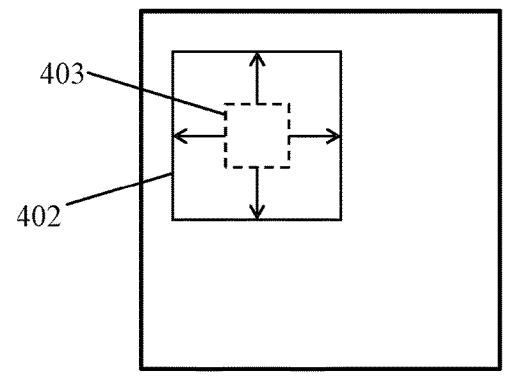

The motion vector detector 109 detects the motion vector using template matching. FIGS. 4A and 4B illustrate the schematic template matching. FIG. 4A illustrates a reference image as one of the two vector detection images, and FIG. 4B illustrates an object image as the other of the two vector detection images. The resolution hierarchical image used for the vector detection image is frame images stored in the resolution hierarchical image storage 105 and image data directly input from the resolution hierarchical image generator 104.

The motion vector detector 109 disposes the template block 401 at a position of the feature point in the reference image, and calculates the correlation value between the template block 401 and each of the plurality of areas in the object image. Since the calculating burden becomes heavy if the correlation values are calculated for all areas in the object image, a rectangular partial area used to calculate the correlation value in the object image is actually set to a search range 402. The position and size of the search range 402 are not particularly limited, but it is necessary to set the position and size of the search range 402 so that an area corresponding to the destination of the template block 401 can be contained in the search range 402 so as to precisely detect the motion vector.

This embodiment uses the sum of absolute difference ("SAD") as the calculating method of the correlation value. Expression (6) defines the calculating expression of the SAD.

[Expression 6]

$$S\_SAD = \Sigma_i \Sigma_j |f(i,j) - g(i,j)| \quad (6)$$

In Expression (6), f(i, j) denotes a luminance value at a coordinate (i, j) in the template block 401. In addition, g(i, j) denotes a luminance value at each coordinate in a block (referred to as a "correlation value calculating block" hereinafter) 403 for which the correlation value is calculated in the search range 402. In the SAD, an absolute value of the difference between the luminance values f(i, j) and g(i, j) in the blocks 401 and 403 is calculated and the sum is calculated so as to obtain the correlation value S_SAD. As the correlation value S_SAD is smaller, the difference of the luminance value between the blocks 401 and 403 is smaller or the similarity of texture between the template block 401 and the correlation value calculating block 403 is higher.

In calculating the correlation value, a method other than the SAD may be used, such as the SSD (Sum of Squared Difference) and NCC (Normalized Cross-Correlation).

The motion vector detector 109 calculates the correlation value by moving the correlation value calculating block 403 in the entire search range 402. Thereby, the correlation value map (referred to as a "SAD map" hereinafter) is produced as illustrated in FIG. 5 for the search range 402.

Figure 5:
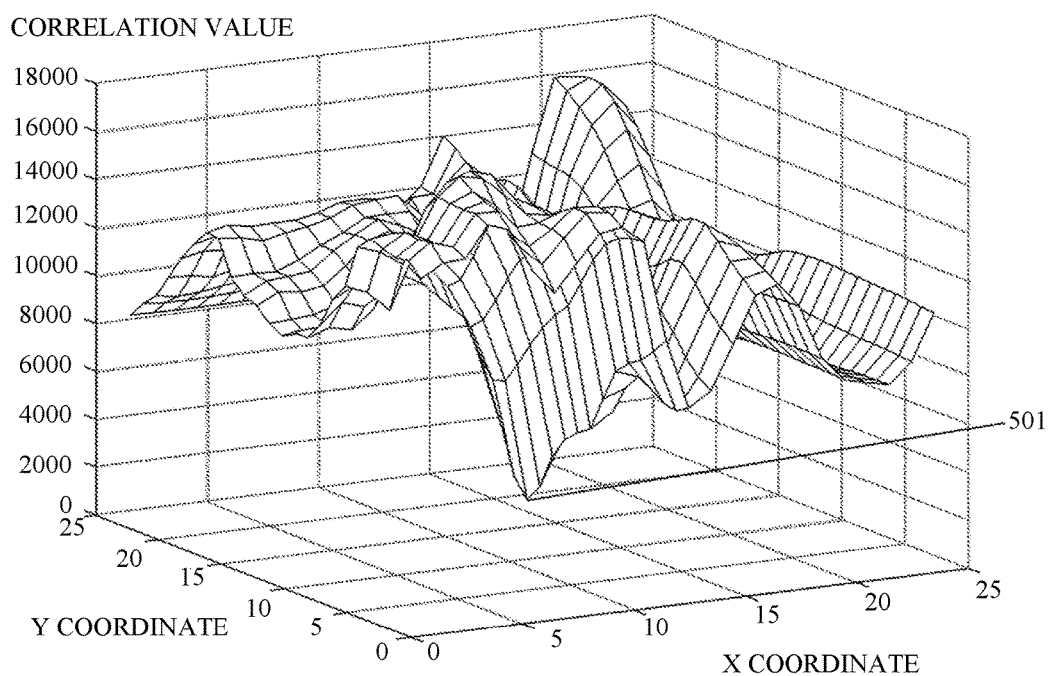
FIG. 5 is a view for explaining a correlation value map according to the first embodiment.

In FIG. 5, the X-axis and Y-axis denote the coordinate in the SAD map (or in the search range 402), and the Z-axis indicates the magnitude of the correlation value in each coordinate. As illustrated, a minimum value 501 has the smallest correlation value, and it is determined that there is texture very similar to the template block 401 in the range (correlation value calculating block 403) in which the minimum value 501 is calculated in the search range 402 (or object image).

Thus, the motion vector detector 109 calculates the correlation value between the template block 401 and the search range 402, and determines the position of the correlation value calculating block 403 having the smallest value. Thereby, the destination of the template block 401 in the reference image can be specified in the object image. Then, the motion vector can be detected that has the direction and size set to the direction of the destination and the moving amount in the object image based on the position of the template block in the reference image.

Figure 6A:
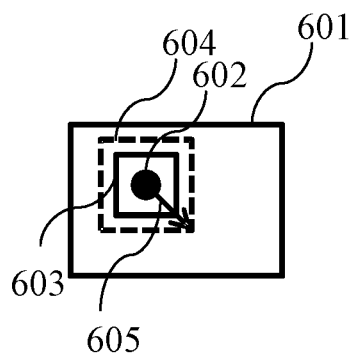
FIGS. 6A-6C are views for explaining a resolution hierarchical motion vector detection according to the first embodiment.
Figure 6B:
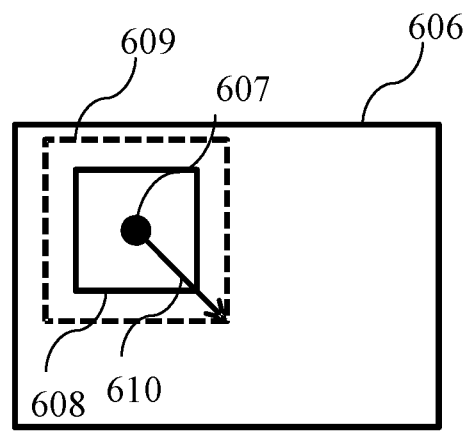
Figure 6C:
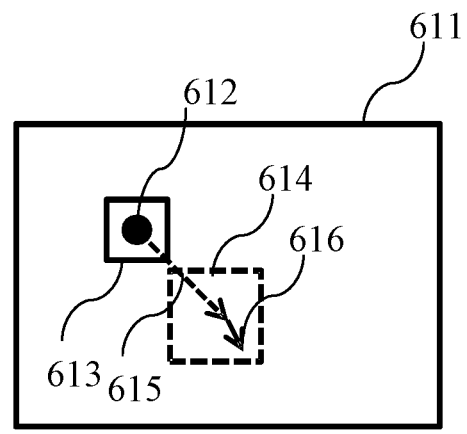

Referring now to FIGS. 6A-6C, a description will be given of the detection of the resolution hierarchical motion vector. In detecting the resolution hierarchical motion vector, the detection result of the motion vector in the higher (lower-resolution) resolution hierarchical image is used for an initial value in the motion vector detection of the lower (higher-resolution) resolution hierarchical image.

FIG. 6A illustrates a motion vector detection in a half reduced image 601 as a higher resolution hierarchical image. Reference numeral 602 denotes a feature point, and reference numeral 603 denotes a template block disposed on the half reduced image 601 (previous frame image as a reference image). Reference numeral 604 is a search range set on the half reduced image 601 (following frame image as an object image), and reference numeral 605 denotes a motion vector detected by the half reduced image 601.

In order to use the motion vector 605 detected in the half reduced image 601 for the initial value in the equally sized image 611 as the lower resolution hierarchical image illustrated in FIG. 6C, it is necessary to equalize the scales of the images 601 and 611 with each other. FIG. 6B illustrates a twice enlarged image 606 that is made by twice enlarging the half reduced image 601 illustrated in FIG. 6A. In association with the twice enlargement of the half reduced image 601, the template block 608, the search range 609, and the motion vector 610 are twice enlarged. Reference numeral 607 denotes a feature point corresponding to a feature point on the half reduced image 601 on the twice enlarged image 606.

In the equally enlarged image 611 illustrated in FIG. 6C, reference numeral 612 denotes a feature point corresponding to the feature point 607 in the twice enlarged image 606, and reference numeral 613 denotes a template block disposed in the equally sized image 611 (the previous frame image as the reference image). Reference numeral 614 denotes a search range set in the equally sized image 611 (following frame image as the object image). Reference numeral 615 is the same motion vector (initial value) as the motion vector 610 in the twice enlarged image 606, and reference numeral 616 denotes a motion vector detected with the equally sized image 611. The motion vector finally detected by the resolution hierarchical motion vector is acquired as a sum of the motion vector 615 and the motion vector 616.

This detection of the resolution hierarchical motion vector can improve the detecting precision of the final motion vector because this detection uses the detection result of the motion vector in the higher resolution hierarchical image for the lower resolution hierarchical image.

If only the lower resolution hierarchical image (equally sized image) is used to detect the motion vector, the motion vector cannot be predicted at all. Thus, similar to FIG. 6B, it is necessary to set the search range that is large to some extent so as to include the entire template block. In addition, in order to avoid the detection of the texture of the periodically repetitive pattern, it is necessary to set a significantly large template block and the search range is increased consequently. As a result, the search range becomes wider.

On the other hand, the motion vector that has been detected in the higher resolution hierarchical image (half reduced image 601) can be used to set the search range in the lower resolution hierarchical image (equally sized image 611). In other words, as illustrated in FIG. 6C, the search range 614 in the equally sized image 611 may be set smaller around the end point of the motion vector 605 (actually motion vector 610 in the twice enlarged image 606) detected in the half reduced image 601. As a result, the search range 614 is less likely to contain the texture of the periodic repetitive pattern, and the template block can be set smaller. By reducing the search range and the size of the template block, the template matching is less subject to the motion in the peripheral range other than the feature point, and the motion vector can be more precisely detected.

As described above, this embodiment detects the resolution hierarchical motion vector using only the resolution hierarchical image having a high correlation between feature points extracted from the respective resolution hierarchical image for the vector detection image, and can improve the detecting precision of the motion vector.

Second Embodiment

Figure 7:
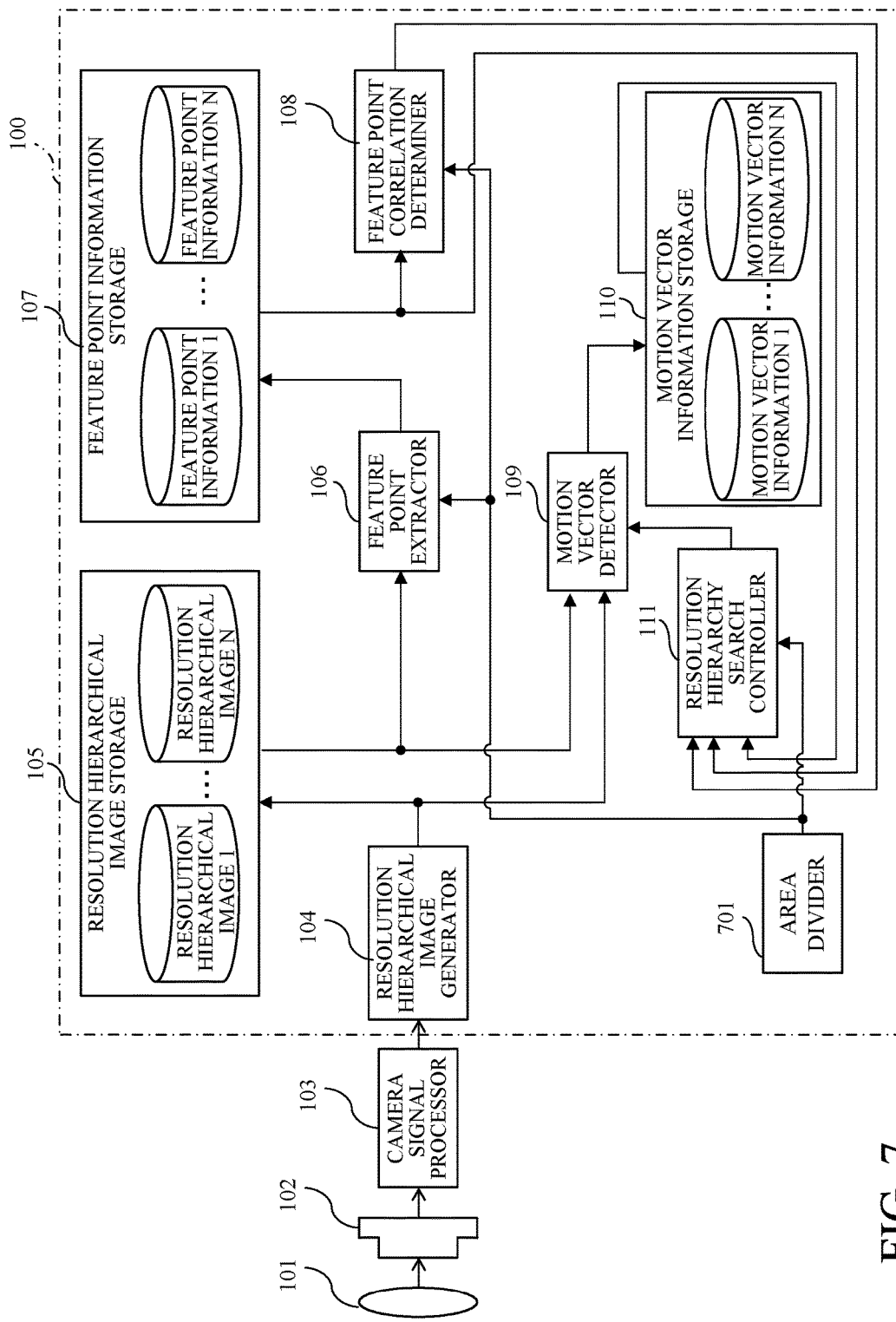
FIG. 7 is a block diagram illustrating a structure of an image pickup apparatus according to a second embodiment of the present invention.

FIG. 7 illustrates a structure of an image pickup apparatus according to a second embodiment of the present invention. In the image pickup apparatus in FIG. 7, those elements, which are the same elements in FIG. 1, are designated by the same reference numerals. In the image pickup apparatus in FIG. 7, those elements, which are corresponding (similar but not identical) elements in FIG. 1, are designated by the same reference numerals and "a" at their ends. The image pickup apparatus according to this embodiment includes the image processing apparatus 200. The image processing apparatus 200 includes an area divider (area dividing unit). The following description will focus mainly on the difference from the first embodiment.

The first embodiment extracts a plurality of feature points for each frame image as a unit, and selects the vector detection image according to a determination result of the feature point correlation for each unit. However, even in a single resolution hierarchical image, the resolution hierarchy suitable for the determination of the feature point correlation and the detection of the motion vector may be different according to the areas. Accordingly, this embodiment divides the resolution hierarchical image into a plurality of image areas, extracts a plurality of feature points for each image area, determines the feature point correlation among the corresponding image areas in the plurality of resolution hierarchical images, and selects the vector detection image for each image area as a unit based on the determination result. Thereby, this embodiment can more precisely detect the resolution hierarchical motion vector than the first embodiment.

Figure 8A:
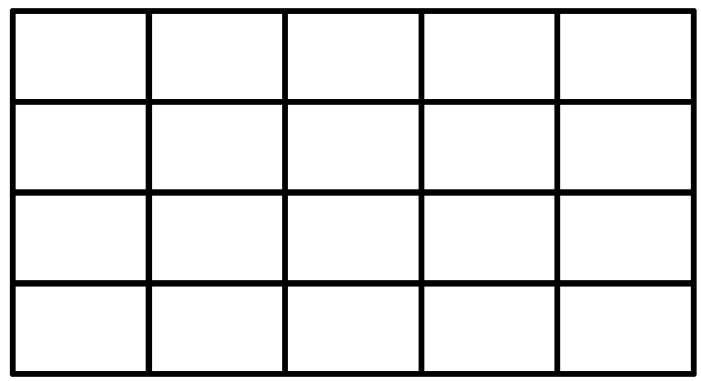
FIGS. 8A and 8B are views for explaining area dividing processing according to a second embodiment.

The area divider 701 outputs division information used to divide each resolution hierarchical image into a plurality of image areas, to the feature point extractor 106*a*, the feature point correlation determiner 108*a*, and the resolution hierarchy search controller 111*a*. While each image area may have an arbitrary shape, this embodiment divides the resolution hierarchical image into a lattice shape, as illustrated in FIG. 8A.

Figure 8B:
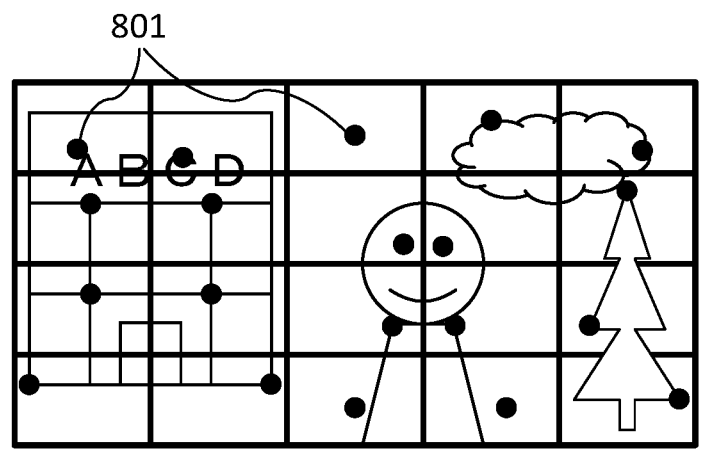

The feature point extractor 106*a* extracts a plurality of or the predetermined number of feature points for each image area based on division information sent from the area divider 701. More specifically, it calculates the feature amount of the pixel based on Expression (3) or (4) for each image area, and extracts a predetermined number of (or a plurality of) pixels in order from the highest feature amount as the feature points. FIG. 8B illustrates that one feature point 801 is extracted for each rectangularly divided image area.

The feature point correlation determiner 108 determines the feature point correlation among the resolution hierarchies for each image area based on the division information sent from the area divider 701. Since the number of feature points extracted for each image area is predetermined, Expression (5) may be used as it is.

The resolution hierarchy search controller 111*a* selects the vector detection image for each image area based on the division information from the area divider 701. The selecting method of the vector detection image may be the same as that of Tables 1 and 2 according to the first embodiment.

According to this embodiment, the resolution hierarchical image selected for each image area may be different and the processing burden may increase in comparison with the first embodiment. However, this embodiment selects the most suitable resolution hierarchical image as the vector detection image for each image area, and can more precisely detect the resolution hierarchical motion vector than the first embodiment.

While the first and second embodiments discuss processing that uses the feature point information in the resolution hierarchical image to detect the motion vector, other processing may be used with this information.

While the first and second embodiments discuss the image pickup apparatus that includes the image processing apparatus 100 or 200, the image processing apparatus may include a personal computer separate from the image pickup apparatus. In this case, the captured image generated by the image pickup apparatus may be input as an input image to the image processing apparatus via the communications and recording medium.

Each of the above embodiments can perform processing using the feature point and select the resolution hierarchical image, even when the feature point has a difference in the plurality of resolution hierarchical images. Therefore, the motion vector can be more precisely detected in the processing for detecting the resolution hierarchical motion vector.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-044461, filed on Mar. 6, 2015, which is hereby incorporated by reference herein in its entirety.

What is claimed is:

1. An image processing apparatus comprising:
an image acquiring unit configured to acquire, based on an input image, a plurality of resolution hierarchical images having resolutions that are different from one another;
an extracting unit configured to extract a feature point in each of the plurality of resolution hierarchical images;
a feature amount acquirer configured to acquire a feature amount of the feature point;
a determining unit configured to determine a correlation among a plurality of feature points in the plurality of resolution hierarchical images using information on positions of the plurality of feature points in each resolution hierarchical image;
a selecting unit configured to select at least one processing object image to be processed with the feature point in the plurality of resolution hierarchical images, based on a determination result of the correlation; and
a processing unit configured to detect a motion vector using the at least one processing object image selected by the selecting unit,
wherein the determining unit determines the correlation between a specified resolution hierarchical image and another resolution hierarchical image that satisfy a predetermined condition of the feature amount in the plurality of resolution hierarchical images,
wherein the selecting unit selects a processing object image including at least the specified resolution hierarchical image for which the determination result of the correlation satisfies the predetermined condition, and does not select a processing object image for which the determination result of the correlation does not satisfy the predetermined condition,
wherein the predetermined condition is one of:
that the feature point having the largest feature amount in the plurality of resolution hierarchical images is included, and
that the feature point having the feature amount equal to or larger than a predetermined value in the plurality of resolution hierarchical images is included,
wherein each unit is implemented by one or more processors, circuitry or a combination thereof, and
wherein the processing unit performs one or more of image stabilization processing and dynamic range enlargement processing on the input images using the detected motion vectors.

2. The image processing apparatus according to claim 1, further comprising:
a dividing unit configured to divide each resolution hierarchical image into a plurality of image areas,
wherein the extracting unit extracts the feature point for each image area in the plurality of resolution hierarchical images,
wherein the determining unit determines the correlation for each image area corresponding to each other in the plurality of resolution hierarchical images, and
wherein the selecting unit selects the processing object image for each image area in the plurality of resolution image based on the determination result of the correlation.

3. The image processing apparatus according to claim 1, wherein the selecting unit selects, as the processing object image for which the determination result of the correlation satisfies the predetermined condition, a resolution hierarchical image that has correlations higher than a predetermined correlation value.

4. The image processing apparatus according to claim 1, wherein when a first image and a second image having a resolution lower than that of the first image are selected as the processing object images, the processing unit detects a motion vector in the first image using a motion vector detected in the second image.

5. An image pickup apparatus comprising:
an image capturing unit configured to generate an input image through image pickup; and
an image processing apparatus that includes:
an image acquiring unit configured to acquire, based on an input image, a plurality of resolution hierarchical images having resolutions that are different from one another;
an extracting unit configured to extract a feature point in each of the plurality of resolution hierarchical images;
a feature amount acquirer configured to acquire a feature amount of the feature point;
a determining unit configured to determine a correlation among a plurality of feature points in the plurality of resolution hierarchical images using information on positions of the plurality of feature points in each resolution hierarchical image;
a selecting unit configured to select at least one processing object image to be processed with the feature point in the plurality of resolution hierarchical images, based on a determination result of the correlation; and
a processing unit configured to detect a motion vector using the at least one processing object image selected by the selecting unit;
wherein the determining unit determines the correlation between a specified resolution hierarchical image and another resolution hierarchical image that satisfy a predetermined condition of the feature amount in the plurality of resolution hierarchical images,
wherein the selecting unit selects a processing object image including at least the specified resolution hierarchical image for which the determination result of the correlation satisfies the predetermined condition, and does not select a processing object image for which the determination result of the correlation does not satisfy the predetermined condition,
wherein the predetermined condition is one of:
that the feature point having the largest feature amount in the plurality of resolution hierarchical images is included, and
that the feature point having the feature amount equal to or larger than a predetermined value in the plurality of resolution hierarchical images is included,
wherein each unit is implemented by one or more processors, circuitry or a combination thereof, and
wherein the processing unit performs one or more of image stabilization processing and dynamic range enlargement processing on the input images using the detected motion vectors.

6. A non-transitory computer-readable storage medium configured to store an image processing program that instructs a computer:
- to acquire, based on an input image, a plurality of resolution hierarchical images having resolutions that are different from one another;
- to extract a feature point in each of the plurality of resolution hierarchical images;
- to acquire a feature amount of the feature point;
- to determine a correlation among a plurality of feature points in the plurality of resolution hierarchical images using information on positions of the plurality of feature points in each resolution hierarchical image;
- to select at least one processing object image to be processed with the feature point in the plurality of resolution hierarchical images, based on a determination result of the correlation;
- detecting a motion vector using the selected at least one processing object image, wherein the correlation is determined between a specified resolution hierarchical image and another resolution hierarchical image that satisfy a predetermined condition of the feature amount in the plurality of resolution hierarchical images, wherein a processing object image including at least the specified resolution hierarchical image for which the determination result of the correlation satisfies the predetermined condition is selected, and a processing object image for which the determination result of the correlation does not satisfy the predetermined condition is not selected, wherein the predetermined condition is one of:

that the feature point having the largest feature amount in the plurality of resolution hierarchical images is included, and that the feature point having the feature amount equal to or larger than a predetermined value in the plurality of resolution hierarchical images is included, and wherein the processing unit performs one or more of image stabilization processing and dynamic range enlargement processing on the input images using the detected motion vectors.

* * * * *